Jan. 26, 1965 N. H. YOUNG, JR., ET AL 3,167,712
FREQUENCY SHIFT KEYER WITH AUTOMATIC FREQUENCY CONTROL
Filed March 17, 1961
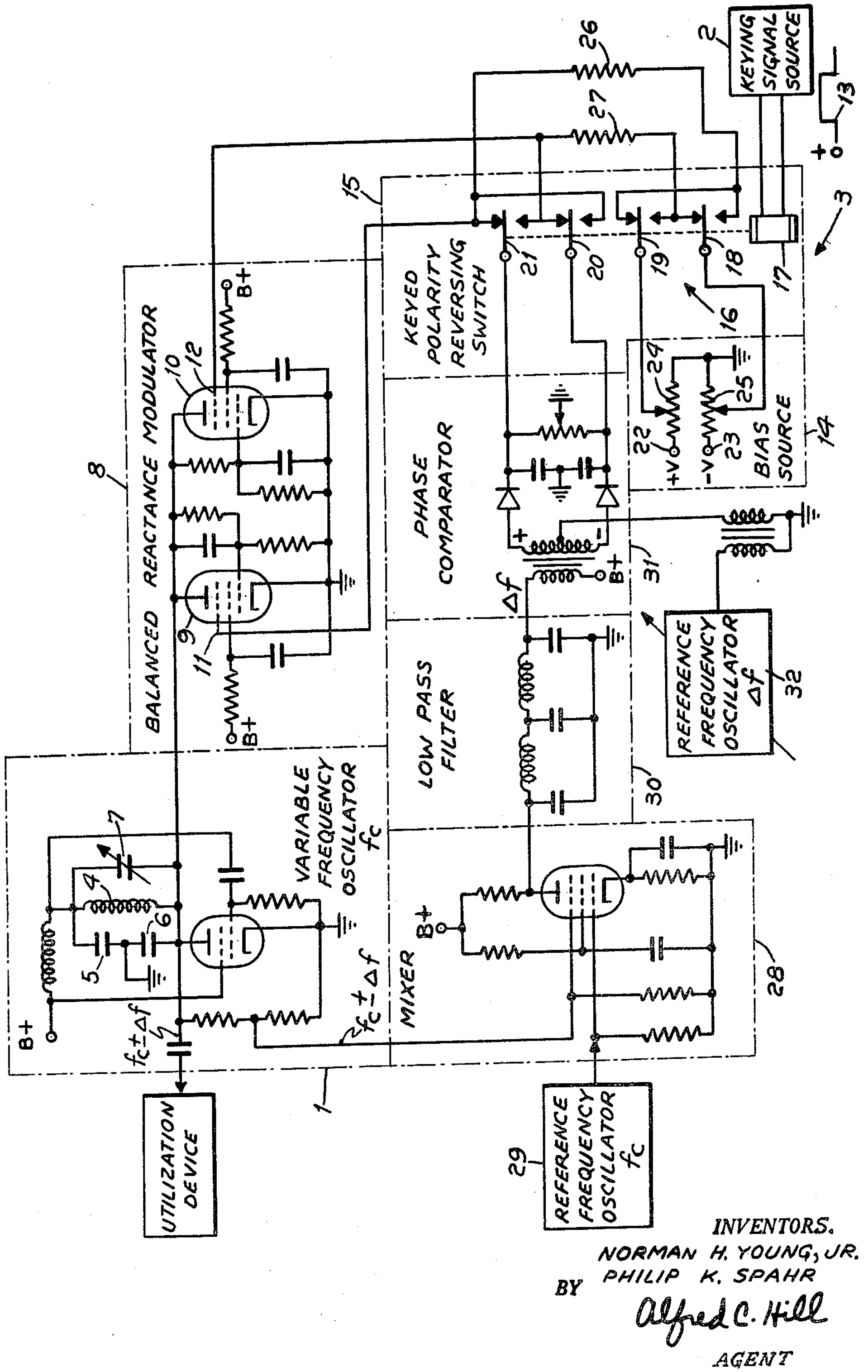
INVENTORS.
NORMAN H. YOUNG, JR.
PHILIP K. SPAHR
BY Alfred C. Hill
AGENT United States Patent Office 3,167,712

Patented Jan. 26, 1965

3,167,712
FREQUENCY SHIFT KEYER WITH AUTOMATIC FREQUENCY CONTROL

Norman H. Young, Jr., and Philip K. Spahr, Nutley, N.J., assignors to International Telephone and Telegraph Corporation, Nutley, N.J., a corporation of Maryland Filed Mar. 17, 1961, Ser. No. 96,478
13 Claims. (Cl. 325—163)

This invention relates to communication systems and more particularly to an improved frequency shift keyer for a frequency shift keyed communication system.

With an increased use of the frequency spectrum for communication purposes, the requirements for frequency precision have increased. Thus, it becomes important to eliminate as many components as possible that contribute to the frequency drift of the signal. Particularly in frequency shift keyed communication systems it is desirable that the center frequency, that is, the average or arithmetic mean of the two frequency signals transmitted, be exactly the assigned channel frequency. This requires both exact symmetry of deviation with respect to the mean frequency and an accurately controlled magnitude of deviation.

One arrangement for a frequency shift keyer is to employ a reactance modulator in combination with a variable frequency oscillator to shift the frequency between two predetermined frequencies in accordance with a frequency control signal in the form of a keying signal or a coded intelligence signal varying between precisely fixed amplitude limits. This arrangement has the disadvantage that the frequency shift oscillator must be checked periodically to insure that it is accurate, that neither the magnitude of deviation nor the symmetry of deviation is inherently closely controlled, and that the amplitude of the keying signal must be accurately controlled.

Therefore, an object of this invention is to provide a frequency shift keyer that will provide an accurate control of both symmetry and magnitude of deviation from the mean frequency.

Another object of this invention is to provide a frequency shift keyer employing a reactance modulator and variable frequency oscillator combination that does not require an accurate control of the amplitude of the keying signal to provide an accurate control of both symmetry and magnitude of deviation from the mean frequency.

In accordance with the principles of this invention, a variable frequency signal has its frequency shifted between two predetermined frequencies in accordance with a coded intelligence or keying signal and the frequency of the resultant variable frequency signal is locked to the predetermined frequencies by an arrangement responsive to the resultant variable frequency signal. This latter arrangement includes a mixer to heterodyne the resultant variable frequency signal with a first reference signal and a comparator to compare the resultant beat signal output of the mixer with a second reference signal to produce a frequency control signal. The resultant frequency control signal is coupled under control of the coded intelligence signal to a frequency control means associated with the source of variable frequency signal to lock the frequency of the resultant variable frequency signal to the predetermined frequencies.

In accordance with a more specific aspect of this invention, a bias voltage, also under the control of the coded intelligence signal, is provided to shift the frequency of the resultant variable frequency signal to at least the vicinity of the predetermined frequencies and the frequency control output signal of the comparator locks the frequency of the resultant variable frequency signal to the predetermined frequencies.

The above-mentioned and other features and objects of this invention will become more apparent by reference to the following description taken in conjunction with the accompanying drawing, in which the single figure is a schematic diagram of a frequency shift keyer in accordance with the principles of this invention.

Referring to the figure, the frequency shift keyer of this invention basically includes a source of variable frequency signal, such as, variable frequency oscillator 1, having the frequency of its output signal shifted between two predetermined frequencies in accordance with the coded intelligence or keying signal of source 2. Source 2 may be any known device producing a signal having one of two signal levels or signal conditions, such as a telegraph key, facsimile equipment, teleprinter equipment, or the like. Means 3 cooperates in response to the output signal of oscillator 1 to lock the frequency of the resultant variable frequency signal to the predetermined frequencies, one frequency representative of one signalling condition, such as a space in a telegraph like signal, and the other frequency representative of the other signalling condition, such as a mark in a telegraph like signal.

More specifically, variable frequency oscillator 1 includes a resonant circuit comprising inductance 4, capacitors 5 and 6, and variable capacitor 7. Variable capacitor 7 may be used to adjust the frequency of the oscillator and, hence, establish a desired center frequency. Additional reactance is added to and subtracted from the resonant circuit of oscillator 1 by balanced modulator 8 including electron discharge devices 9 and 10. In accordance with this arrangement, by varying the voltages on grids 11 and 12 of devices 9 and 10, respectively, the frequency of the oscillator 1 may be shifted a given amount below its center frequency and a similar amount above its center frequency to thereby provide the desired frequency shift signal. The resultant frequency of the output signal of oscillator 1 will be determined by the coded intelligence signal of source 2.

To facilitate the description of the frequency shift keyer of this invention, let us assume that the proper combination of voltages exists on grids 11 and 12 of devices 9 and 10, respectively, to cause the frequency of oscillator 1 to be below its center frequency $f_c$, by an amount $\Delta f$ and that the signal 13 of source 2 is at its lower signalling condition, indicated for the purposes of explanation to be 0. With the illustrated schematic diagram of reactance modulator 8 the frequency of oscillator 1 will be decreased if the capacitive reactance current in device 9 is larger than the inductive reactance current in device 10. This current relationship can be obtained by coupling a bias voltage to grid 11 which is positive with respect to a bias voltage applied to grid 12. In accordance with the figure, bias voltages to be coupled to grids 11 and 12 are obtained from a bias source 14 under control of signal 13 of source 2 through the medium of keyed polarity reversing switch 15. Switch 15 is illustrated for purposes of explanation to include a relay 16 having a solenoid 17 coupled to source 2 and four armatures 18, 19, 20 and 21. Source 14 includes a source of positive potential +v coupled to terminal 22 and a source of negative potential −v coupled to terminal 23 with potentiometers 24 and 25 coupled respectively to terminals 22 and 23. The first assumption is satisfied when relay 16 is unenergized in the presence of the zero level of signal 13, that is, when armatures 18, 19, 20, and 21 are positioned as illustrated. Thus, the positive bias voltage is coupled from potentiometer 24 through armature 19 to resistor 26 and, hence, to grid 11 and the negative bias voltage is coupled from potentiometer 25 through armature 18 to resistor 27, and hence, to grid 12. It may therefore be stated that the bias voltage of source 14 is a frequency control signal that at least adjusts the frequency of the output signal of oscillator 1 to approximately a value $\Delta f$ removed from the center frequency $f_c$ which with the above assumption is a value equal to $f_c-\Delta f$.

The frequency-shifted output signal of oscillator 1 is maintained at $f_c-\Delta f$ in accordance with this invention by coupling at least a portion of the frequency-shifted output signal to mixer 28 where it is heterodyned with a reference frequency signal from oscillator 29. The signal of oscillator 29 has a frequency equal to the center frequency of oscillator 1, namely, $f_c$. The usual modulation products appear at the output of mixer 28, namely, signals having frequencies $f_c$, $f_c-\Delta f$, $f_c+\Delta f$, and $\Delta f$. Low pass filter 30 coupled to the output of mixer 28 passes only that signal having a frequency $\Delta f$, the deviation frequency, to phase comparator 31. Phase comparator 31 compares the phase of the output signal of filter 30 with a reference signal produced in oscillator 32 having a frequency $\Delta f$. The comparison of these two signals produces a frequency control signal varying in accordance with the phase difference between the two signals. When the output signal of filter 30 and the output signal of oscillator 32 are in phase, the output of comparator 31 will be zero, indicating that the resultant frequency-shifted signal output of oscillator 1 is locked to the predetermined frequency $f_c-\Delta f$. If there is a phase difference between the output signal of filter 30 and the output signal of oscillator 32, a correcting frequency signal will be coupled through armatures 20 and 21 to the grids 12 and 11, respectively, superimposed upon the bias voltage from source 14 to correct the frequency of the output signal of oscillator 1 to maintain the output signal locked to the predetermined frequency $f_c-\Delta f$. By making oscillator 32 adjustable the frequency deviation can be adjusted by adjustment of oscillator 32.

When signal 13 of source 2 assumes its higher signalling condition, indicated for purposes of explanation to be +, solenoid 17 is energized, causing armatures 18, 19, 20 and 21 to assume their other contact position. Under this condition the polarity of the bias voltage of source 14 and the sense of the error signal, if any, from phase comparator 31 are simultaneously reversed causing the oscillator to shift its frequency from one predetermined frequency $f_c-\Delta f$, to a second predetermined frequency, $f_c+\Delta f$. Should the bias voltage and the error voltage be such that the frequency of the output signal of oscillator 1 is slightly different than the predetermined frequency, $f_c+\Delta f$, that is, the beat signal output of filter 30 is not in phase with and, hence, has a slightly different frequency than the output signal of oscillator 32, phase comparator 31 will produce a correcting frequency control signal for application to reactance modulator 8 having the proper sense and magnitude to lock the signal output of oscillator 1 to the desired predetermined frequency $f_c+\Delta f$.

The action of the frequency shift key of this invention is identical whether the frequency of the output signal of oscillator 1 goes from $f_c-\Delta f$ to $f_c+\Delta f$ or from $f_c+\Delta f$ to $f_c-\Delta f$. It is obvious that with the corresting frequency control signal from comparator 31 that the mean frequency of the two predetermined frequencies is stable, that the magnitude of the deviation is constant, and that the amplitude of the keying signal, signal 13, need not be controlled to change between two fixed levels. The amplitude of the keying signal only need be sufficient to trigger switch 15.

Relay 16 is illustrated as one form of keyed polarity reversing switch 15, but it is to be remembered that the switching action may be executed electronically, particularly where there is a requirement of speed in excess of that which can be obtained with an electromechanical relay.

While we have described above the principles of our invention in connection with specific apparatus, it is to be clearly understood that this description is made only by way of example and not as a limitation to the scope of our invention as set forth in the objects thereof and in the accompanying claims.

We claim:

1. A frequency shift keyer comprising a source of variable frequency signal, control means coupled to said source of variable frequency signal to shift the frequency of said variable frequency signal between two predetermined frequencies in accordance with a coded intelligence signal, a source of reference signal having a given frequency, means coupled to said source of variable frequency signal to produce a resultant signal having a frequency related to said given frequency, means responsive to said reference signal and said resultant signal to produce a control signal varying in accordance with the phase different between said reference signal and said resultant signal, and means responsive to said intelligence signal to couple said control signal to said control means to accurately position the frequency of said variable frequency signal at said predetermined frequencies.

2. A frequency shift keyer comprising a source of variable frequency signal, a source of first reference signal, a source of second reference signal having a given frequency, control means coupled to said source of variable frequency signal to shift the frequency of said variable frequency signal between two selected frequencies in accordance with a coded intelligence signal, each of said selected frequencies being spaced from a predetermined means frequency by an amount equal to said given frequency, means responsive to said first reference signal and said variable frequency signal to produce a resultant signal having a frequency related to said given frequency, means responsive to said second reference signal and said resultant signal to produce a control signal varying in accordance with the phase difference between said second reference signal and said resultant signal, and means responsive to said intelligence signal to couple said control signal to said control means to accurately position the frequency of the resultant frequency-shifted signal output of said source of variable frequency signal at said selected frequencies.

3. A frequency shift keyer comprising a source of variable frequency signal, a source of first reference signal, a source of second reference signal having a given frequency, control means coupled to said source of variable frequency signal to shift the frequency of said variable frequency signal between two selected frequencies in accordance with a coded intelligence signal, each of said selected frequencies being spaced from a predetermined means frequency by an amount equal to said given frequency, a mixer coupled to said source of variable frequency signal and said source of first reference signal to produce a beat signal having a frequency related to said given frequency, means responsive to said second reference signal and said beat signal to produce a control signal varying in accordance with the phase difference between said second reference signal and said beat signal, and means responsive to said intelligence signal to couple said control signal to said control means to accurately position the frequency of the resultant frequency-shifted signal output of said source of variable frequency signal at said selected frequencies.

4. A frequency shift keyer comprising a source of variable frequency signal, a source of first reference signal, a source of second reference signal having a given frequency, a reactance modulator coupled to said source of variable frequency signal to shift the frequency of said variable frequency signal between two selected frequencies in accordance with a coded intelligence signal, each of said selected frequencies being spaced from a predetermined mean frequency by an amount equal to said given frequency, a mixer coupled to said source of first reference signal and said source of variable frequency signal to produce a beat signal having a frequency related to said given frequency, means responsive to said second reference signal and said beat signal to produce a control signal varying in accordance with the phase difference between said second reference signal and said beat signal, and means responsive to said intelligence signal to couple said control signal to said reactance modulator to accurately position the frequency of the resultant frequency-shifted signal output of said source of variable frequency signal at said selected frequencies.

5. A frequency shift keyer comprising a source of variable frequency signal, a source of first reference signal, a source of second reference signal having a given frequency, a balanced reactance modulator coupled to said source of variable frequency signal to shift the frequency of said variable frequency signal between two selected frequencies in accordance with a coded intelligence signal, each of said selected frequencies being spaced from a predetermined mean frequency by an amount equal to said given frequency, a mixer coupled to said source of first reference signal and said source of variable frequency signal to produce a beat signal having a frequency equal to said given frequency, a phase comparator coupled to said source of second reference signal and said mixer to produce a control signal varying in accordance with the phase difference between said second reference signal and said beat signal, and means responsive to said intelligence signal to couple said control signal to said reactance modulator to accurately control the frequency of the resultant frequency-shifted signal output of said source of variable frequency signal at said selected frequencies.

6. A frequency shift keyer comprising a source of variable frequency signal having a predetermined center frequency, a source of first reference signal having a frequency equal to said center frequency, a source of second reference signal having a given frequency, a balanced reactance modulator coupled to said source of variable frequency signal to shift the frequency of said variable frequency signal between two selected frequencies in accordance with a coded intelligence signal, each of said selected frequencies being spaced symmetrically from said center frequency by an amount equal to said given frequency, a mixer coupled to said source of first reference signal and said source of variable frequency signal to produce a beat signal having a frequency related to said given frequency, a phase comparator coupled to said source of second reference signal and said mixer to produce a control signal varying in accordance with the phase difference between said second reference signal and said beat signal, and switching means responsive to said intelligence signal to couple said control signal to said reactance modulator to accurately control the frequency of the resultant frequency-shifted signal output of said source of variable frequency signal at said selected frequencies.

7. A frequency shift keyer comprising a source of variable frequency signal, a frequency control means coupled to said source, means coupled to said source including at least means responsive to the signal of said source to provide a frequency control signal, a switching means coupled to said responsive means and said control means, and a source of coded intelligence signal coupled to said switching means to control the coupling of said control signal to said control means to shift the frequency of said variable frequency signal between two predetermined frequencies in accordance with said intelligence signal and to maintain the frequency of said variable frequency signal at said predetermined frequencies.

8. A frequency shift keyer comprising a source of variable frequency signal, a reactance modulator coupled to said source of variable frequency signal, means coupled to said source of variable frequency signal including at least means responsive to said variable frequency signal to provide a frequency control signal, a polarity reversing switching means coupled to said responsive means and said reactance modulator, and a source of coded intelligence signal coupled to said switching means to control the coupling of said control signal to said reactance modulator to shift the frequency of said variable frequency signal between two predetermined frequencies in accordance with said intelligence signal and to maintain the frequency of said variable frequency signal at said predetermined frequencies.

9. A frequency shift keyer comprising a source of variable frequency signal, a reactance modulator coupled to said source of variable frequency signal, a source of reference signal having a given frequency, means coupled to said source of variable frequency signal to produce a resultant signal having a frequency related to said given frequency, means responsive to said reference signal and said resultant signal to provide a frequency control signal varying in accordance with the phase difference between said reference signal and said resultant signal, a polarity reversing switching means coupled to said responsive means and said reactance modulator, and a source of coded intelligence signal coupled to said switching means to control the coupling of said control signal to said reactance modulator to shift the frequency of said variable frequency signal in accordance with said intelligence signal between two selected frequencies each spaced from a predetermined mean frequency by an amount equal to said given frequency and to maintain the frequency of the resultant frequency-shifted signal output of said source of variable frequency signal at said selected frequencies.

10. A frequency shift keyer comprising a source of variable frequency signal, a reactance modulator coupled to said source of variable frequency signal, a source of first reference signal, a source of second reference signal having a given frequency, means responsive to said first reference signal and said variable frequency signal to produce a resultant signal having a frequency related to said given frequency, means responsive to said second reference signal and said resultant signal to provide a frequency control signal varying in accordance with the phase difference between said second reference signal and said resultant signal, a polarity reversing switching means coupled to said responsive means and said reactance modulator, and a source of coded intelligence signal coupled to said switching means to control the coupling of said control signal to said reactance modulator to shift the frequency of said variable frequency signal in accordance with said intelligence signal between two selected frequencies each spaced from a predetermined mean frequency by an amount equal to said given frequency and to maintain the frequency of the resultant frequency-shifted signal output of said source of variable frequency signal at said selected frequencies.

11. A frequency shift keyer comprising a source of variable frequency signal, a reactance modulator coupled to said source of variable frequency signal, a source of first reference signal, a source of second reference signal having a given frequency, a mixer coupled to said source of variable frequency signal and said source of first reference signal to produce a beat signal having a frequency related to said given frequency, means responsive to said second reference signal and said beat signal to provide a frequency control signal varying in accordance with the phase difference between said second reference signal and said beat signal, a polarity reversing switching means coupled to said responsive means and said reactance modulator, and a source of coded intelligence signal coupled to said switching means to control the coupling of said control signal to said reactance modulator to shift the frequency of said variable frequency signal in accordance with said intelligence signal between two selected frequencies each spaced from a predetermined mean frequency by an amount equal to said given frequency and to maintain the frequency of the resultant frequency-shifted signal output of said source of variable frequency signal at said selected frequencies.

12. A frequency shift keyer comprising a source of variable frequency signal, a balanced reactance modulator coupled to said source of variable frequency signal, a source of first reference signal, a source of second reference signal having a given frequency, a mixed coupled to said source of variable frequency signal and said source of first reference signal to produce a beat signal having a frequency related to said given frequency, a phase comparator responsive to said second reference signal and said beat signal to provide a frequency control signal varying in accordance with the phase difference between said reference signal and said beat signal, a polarity reversing switching means coupled to said phase comparator and said reactance modulator, and a source of coded intelligence signal coupled to said switching means to control the coupling of said control signal to said reactance modulator to shift the frequency of said variable frequency signal in accordance with said intelligence signal between two selected frequencies each spaced from a predetermined mean frequency by an amount equal to said given frequency and to maintain the frequency of the resultant frequency-shifted signal output of said source of variable frequency signal at said selected frequencies.

13. A frequency shift keyer comprising a source of variable frequency signal, a frequency control means coupled to said source of variable frequency signal, a bias source to provide a first frequency control signal, means responsive to said variable frequency signal to provide a second frequency control signal, a switching means coupling said responsive means and said bias source to said control means, and a source of coded intelligence signal coupled to said switching means to control in accordance with said intelligence signal the coupling of said first control signal to said control means to shift the frequency of said variable frequency signal between two predetermined frequencies and said second control signal to said control means to maintain the frequency of said variable frequency signal at said predetermined frequencies.

14. A frequency shift keyer comprising a source of variable frequency signal, a reactance modulator coupled to said source of variable frequency signal, a bias source to provide a first frequency control signal, means responsive to said variable frequency signal to provide a second frequency control signal, a polarity reversing switching means coupling said responsive means and said bias source to said reactance modulator, and a source of coded intelligence signal coupled to said switching means to control in accordance with said intelligence signal the coupling of said first control signal to said reactance modulator to shift the frequency of said variable frequency signal between two predetermined frequencies and said second control signal to said reactance modulator to maintain the frequency of said variable frequency signal at said predetermined frequencies.

15. A frequency shift keyer comprising a source of variable frequency signal, a reactance modulator coupled to said source of variable frequency signal, a bias source to provide a first frequency control signal, a source of reference signal having a given frequency, means coupled to said source of variable frequency signal to produce a resultant signal having a frequency related to said given frequency, means responsive to said reference signal and said resultant signal to provide a second frequency control signal varying in accordance with the phase difference between said reference signal and said resultant signal, a polarity reversing switching means coupling said responsive means and said bias source to said reactance modulator, and a source of coded intelligence signal coupled to said switching means to control in accordance with said intelligence signal the coupling of said first control signal to said reactance modulator to shift the frequency of said variable frequency signal between two selected frequencies each spaced from a predetermined mean frequency by an amount equal to said given frequency and said second control signal to said reactance modulator to maintain the frequency of the resultant frequency-shifted signal output of said source of variable frequency signal at said selected frequencies.

16. A frequency shift keyer comprising a source of variable frequency signal, a reactance modulator coupled to said source of variable frequency signal, a bias source to provide a first frequency control signal, a source of first reference signal, a source of second reference signal having a given frequency, means responsive to said first reference signal and said variable frequency signal to produce a resultant signal having a frequency related to said given frequency, means responsive to said second reference signal and said resultant signal to provide a second frequency control signal varying in accordance with the phase difference between said reference signal and said resultant signal, a polarity reversing switching means coupling said responsive means and said bias source to said reactance modulator, and a source of coded intelligence signal coupled to said switching means to control in accordance with said intelligence signal the coupling of said first control signal to said reactance modulator to shift the frequency of said variable frequency signal between two selected frequencies each spaced from a predetermined mean frequency by an amount equal to said given frequency and said second control signal to said reactance modulator to maintain the frequency of the resultant frequency-shifted signal output of said source of frequency signal at said selected frequencies.

17. A frequency shift keyer comprising a source of variable frequency signal, a reactance modulator coupled to said source of variable frequency signal, a bias source to provide a first frequency control signal, a source of first reference signal, a source of second reference signal having a given frequency, a mixer coupled to said source of variable frequency signal and said source of first reference signal to produce a beat signal having a frequency related to said given frequency, means responsive to said second reference signal and said beat signal to provide a second frequency control signal varying in accordance with the phase difference between said reference signal and said beat signal, a polarity reversing switching means coupling said responsive means and said bias source to said reactance modulator, and a source of coded intelligence signal coupled to said switching means to control in accordance with said intelligence signal the coupling of said first control signal to said reactance modulator to shift the frequency of said variable frequency signal between two selected frequencies each spaced from a predetermined mean frequency by an amount equal to said given frequency and said second control signal to said reactance modulator to maintain the frequency of the resultant frequency-shifted signal output of said source of variable frequency signal at said selected frequencies.

18. A frequency shift keyer comprising a source of variable frequency signal, a balanced reactance modulator coupled to said source of variable frequency signal, a bias source to provide a first frequency control signal, a source of first reference signal, a source of second reference signal having a given frequency, a mixer coupled to said source of variable frequency signal and said source of said first reference signal to produce a beat signal having a frequency related to said given frequency, a phase comparator responsive to said second reference signal and said beat signal to provide a second frequency control signal varying in accordance with the phase difference between said reference signal and said beat signal, a polarity reversing switching means coupling said phase comparator and said bias source to said reactance modulator, and a source of coded intelligence signal coupled to said switching means to control in accordance with said intelligence signal the coupling of said first control signal to said reactance modulator to shift the frequency of said variable frequency signal between two selected frequencies each spaced from a predetermined mean frequency by an amount equal to said given frequency and said second control signal to said reactance modulator to maintain the frequency of the resultant frequency-shifted signal output of said source of variable frequency signal at said selected frequencies.

References Cited in the file of this patent

UNITED STATES PATENTS

| | | |
|---|---|---|
| 2,492,795 | Goldstine | Dec. 27, 1949 |
| 2,689,881 | Leypold | Sept. 21, 1954 |
| 2,866,161 | Davidoff | Dec. 23, 1958 |